US012680506B2

(12) United States Patent
Poumarede et al.

(10) Patent No.: US 12,680,506 B2
(45) Date of Patent: Jul. 14, 2026

(54) METHOD AND SYSTEM FOR DUAL-VOLTAGE START OF AN AERONAUTICAL TURBINE ENGINE HAVING A FREE TURBINE AND A SINGLE-SPOOL GAS GENERATOR

(71) Applicant: SAFRAN HELICOPTER ENGINES, Bordes (FR)

(72) Inventors: Vincent Poumarede, Moissy-Cramayel (FR); Sylvain Pierre Votie, Moissy-Cramayel (FR); Lucie Stéphanie Apostin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 19/156,246

(22) PCT Filed: Feb. 13, 2024

(86) PCT No.: PCT/FR2024/050194
§ 371 (c)(1),
(2) Date: Aug. 13, 2025

(87) PCT Pub. No.: WO2024/170853
PCT Pub. Date: Aug. 22, 2024

(65) Prior Publication Data
US 2026/0126013 A1 May 7, 2026

(30) Foreign Application Priority Data
Feb. 14, 2023 (FR) ........................................ 2301370

(51) Int. Cl.
*F02C 7/268* (2006.01)
*B64D 31/18* (2024.01)
(Continued)

(52) U.S. Cl.
CPC .............. *F02C 7/268* (2013.01); *B64D 31/18* (2024.01); *B64D 41/00* (2013.01); *F02C 7/266* (2013.01);
(Continued)

(58) Field of Classification Search
CPC .. F02C 7/26; F02C 7/262; F02C 7/266; F02C 7/268; F02C 7/275; F02N 11/0866;
(Continued)

(56) References Cited

U.S. PATENT DOCUMENTS 3,793,825 A * 2/1974 Dickhart ................. F02C 7/262
60/790
10,450,962 B2 * 10/2019 Poumarede ............... F02C 7/26
(Continued)

FOREIGN PATENT DOCUMENTS

EP 3092389 B1 11/2016

OTHER PUBLICATIONS

Search Report and Written Opinion issued in International Application No. PCT/FR2024/050194, mailed Jun. 7, 2024.

*Primary Examiner* — Kyle Robert Thomas
(74) *Attorney, Agent, or Firm* — Bookoff McAndrews, PLLC

(57) ABSTRACT

Method for starting an aeronautical free turbine and single-spool gas generator turbomachine of a twin-engine aircraft including two independent electrical networks each comprising a 28V battery selectively powering a starter-generator, in which, to ensure, under the control of a turbomachine regulation computer, the startup of the turbomachine first at a voltage of 28V by putting the two batteries in parallel and then at a voltage of 56V by putting them in series while avoiding too rapid acceleration of the gas generator, the serialization of the two batteries is ordered only once the combustion chamber of the gas generator is ignited and the (Continued)

speed of the gas generator is greater than a predetermined speed threshold N1 for ensuring, through this serialization, a positive acceleration margin at the point of maximum drag of the gas generator.

10 Claims, 14 Drawing Sheets

(51) Int. Cl.
  B64D 41/00      (2006.01)
  F02C 7/266      (2006.01)
  F02N 11/08      (2006.01)

(52) U.S. Cl.
  CPC ...... F02N 11/0866 (2013.01); *B64D 2221/00*
        (2013.01); *F02N 2011/0877* (2013.01); *F05D*
                                    *2260/85* (2013.01)

(58) Field of Classification Search
  CPC .............. F02N 11/087; F02N 11/0877; F05D
            2220/329; F05D 2270/52; B64D 31/18;
                  B64D 41/00; B64D 2221/00
  See application file for complete search history.

(56)                References Cited

U.S. PATENT DOCUMENTS

2014/0250909 A1* 9/2014 Sowden .............. F02N 11/0866
                                              60/778
2018/0029721 A1   2/2018 Mariotto et al.

* cited by examiner

[Fig. 1]
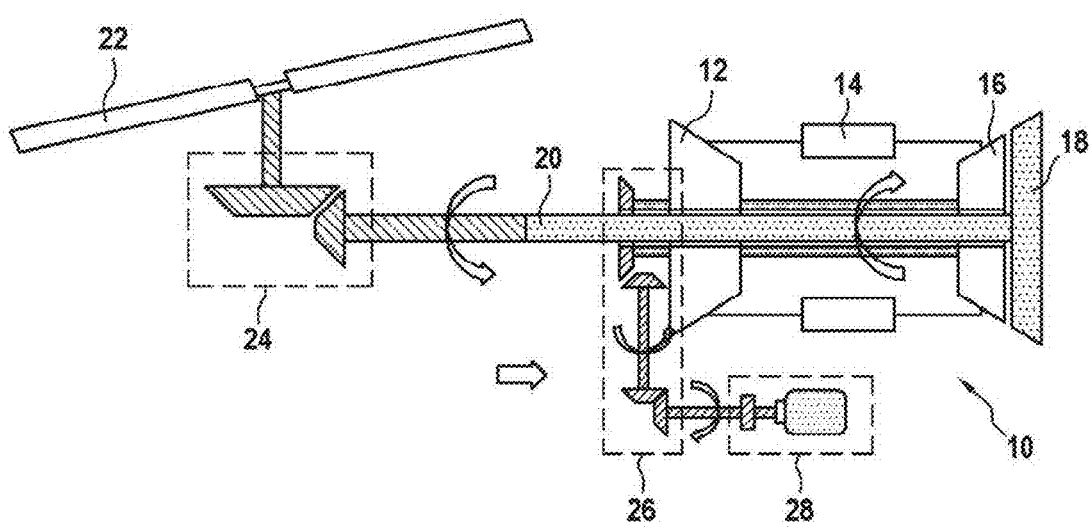
[Fig. 2]
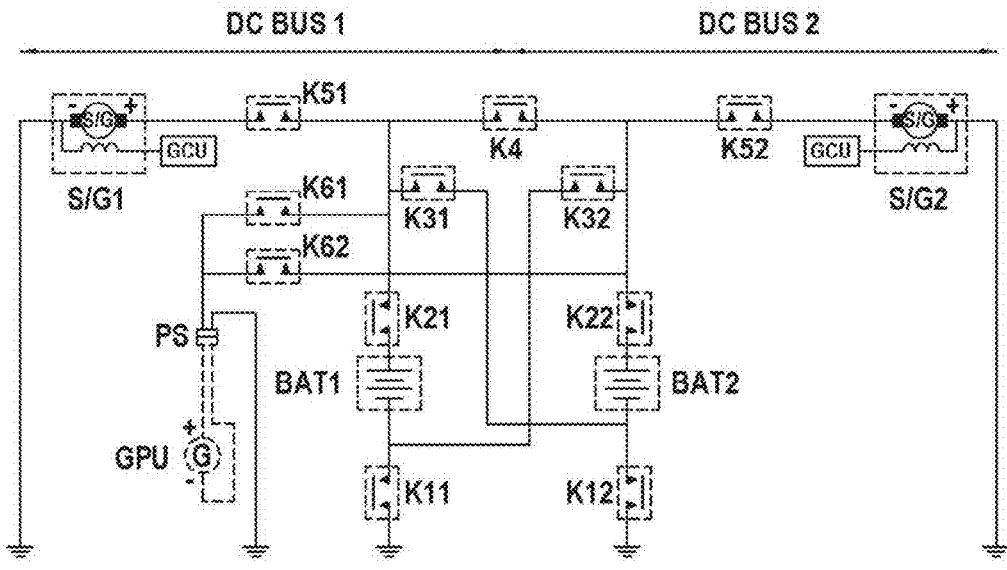

[Fig. 3]
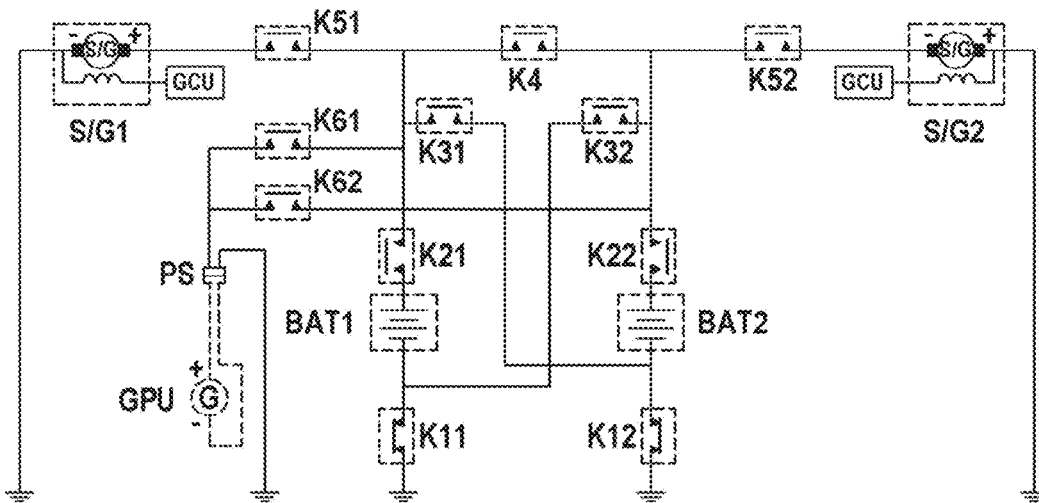
[Fig. 4]
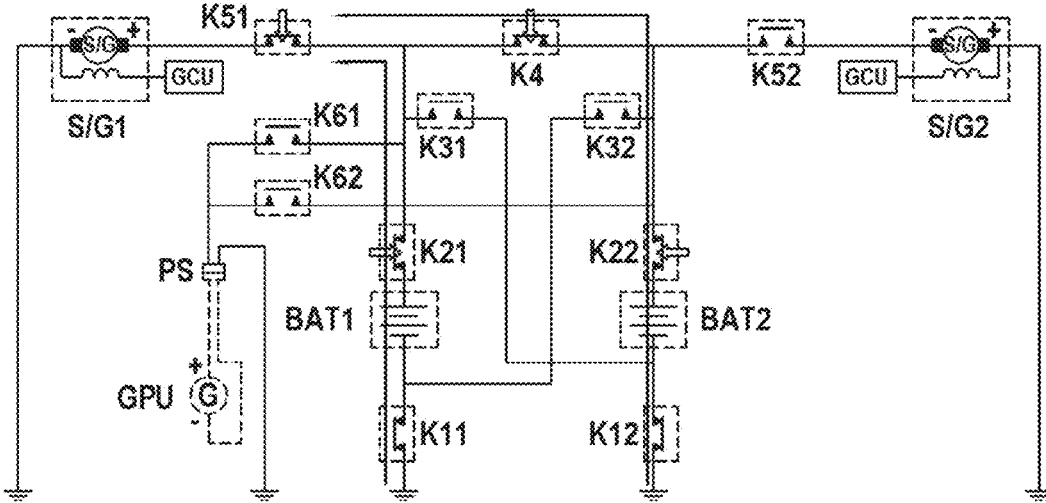

[Fig. 5]
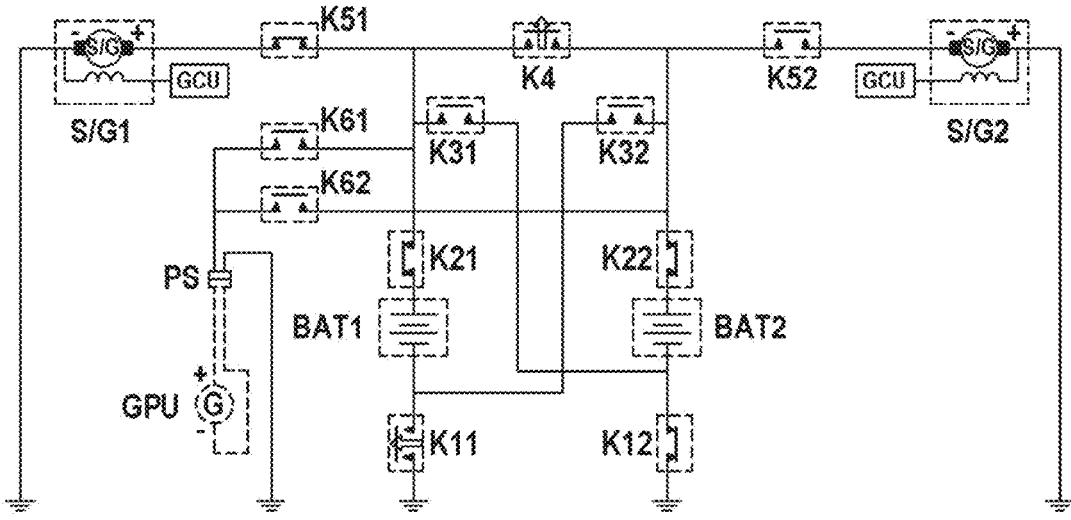
[Fig. 6]
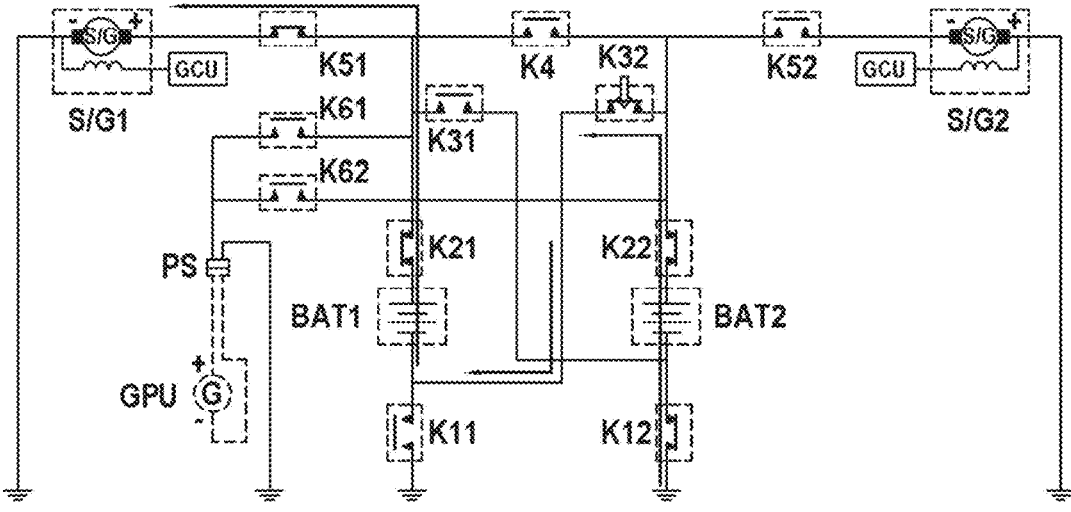

[Fig. 7]
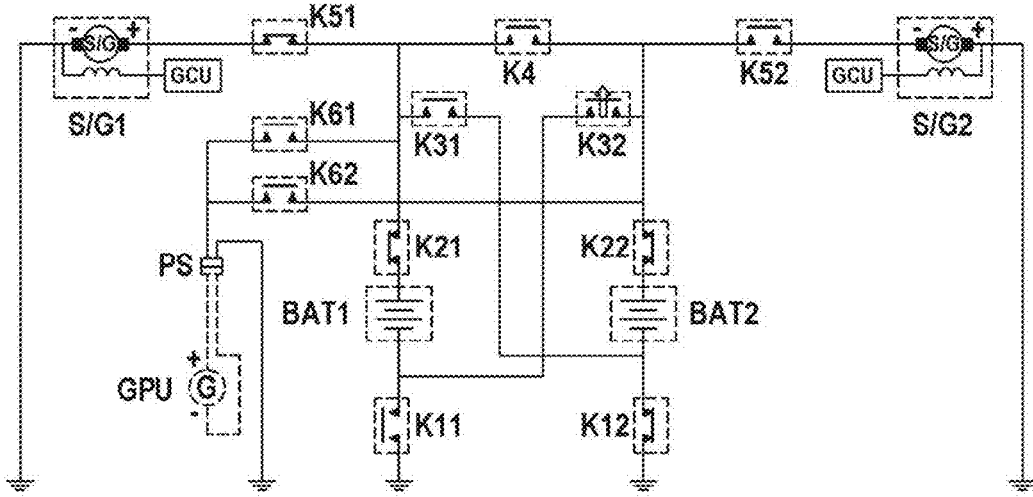
[Fig. 8]
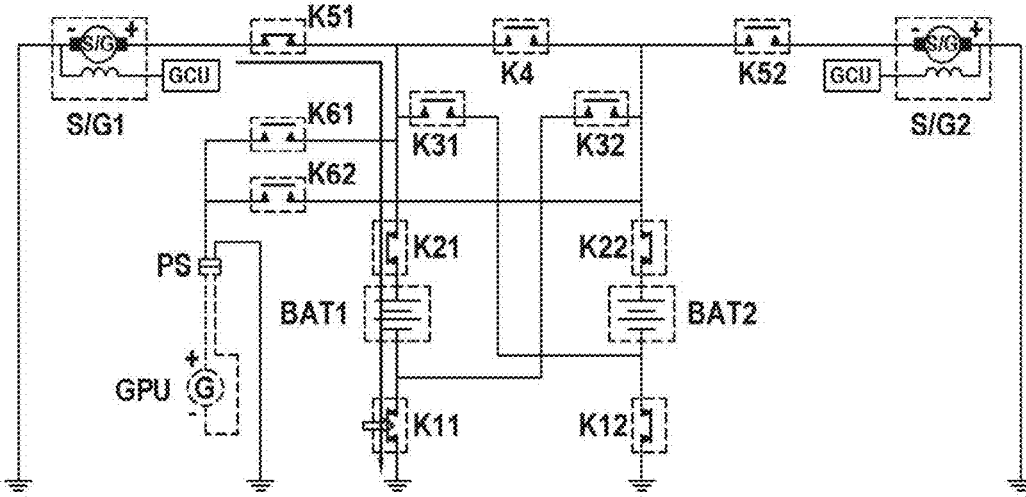

[Fig. 9]
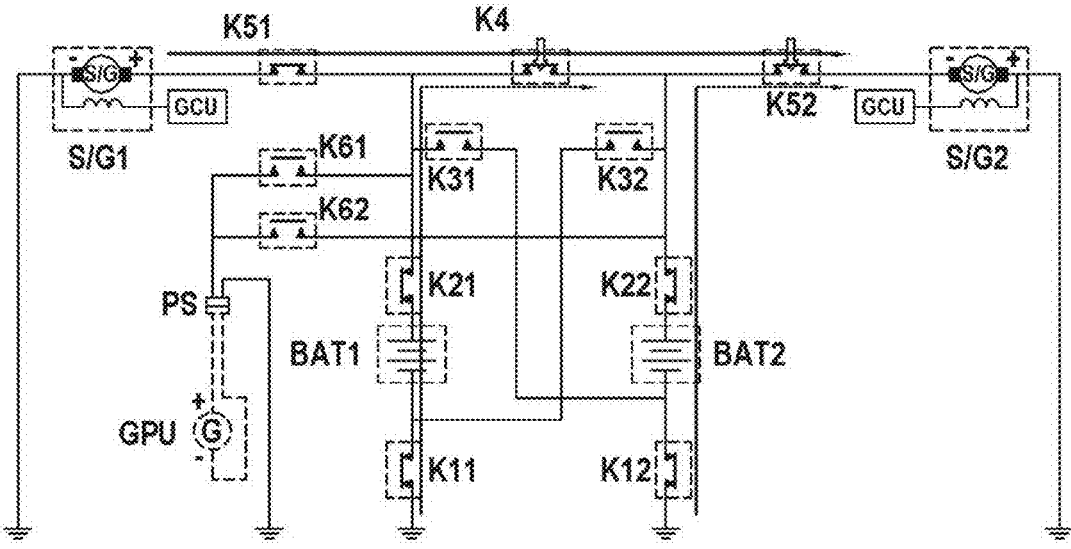
[Fig. 10]
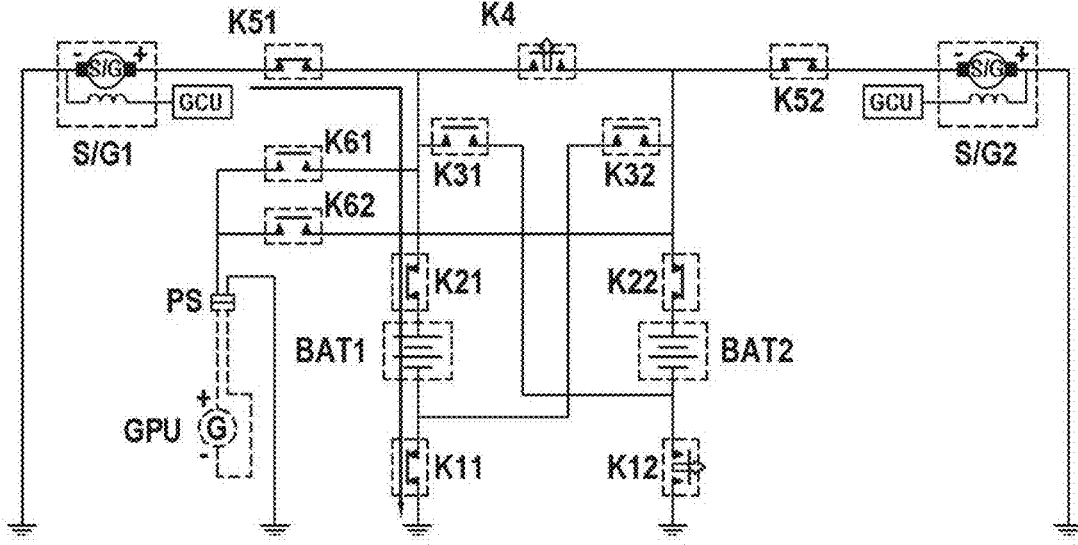

[Fig. 11]
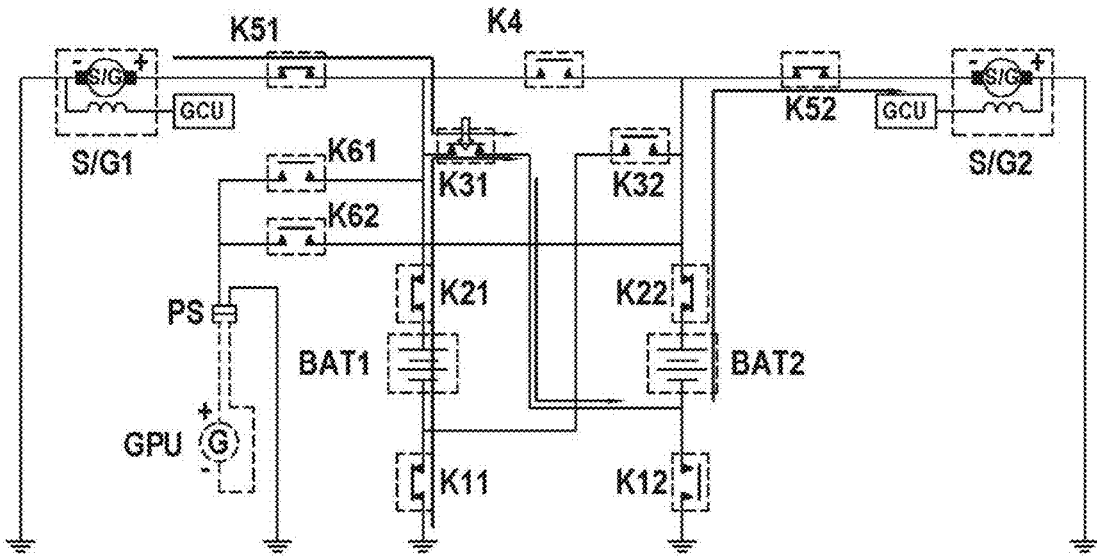
[Fig. 12]
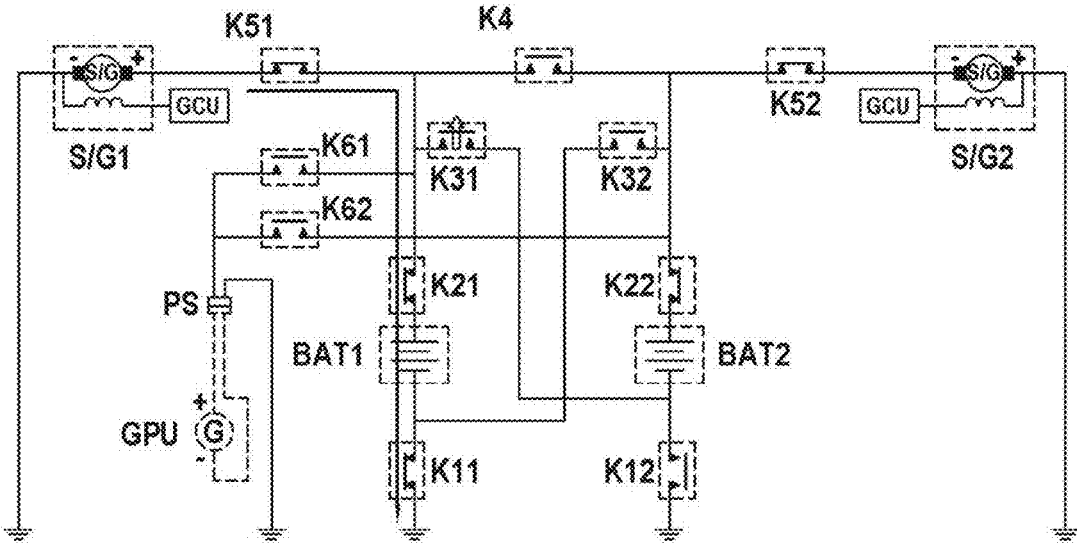

[Fig. 13]
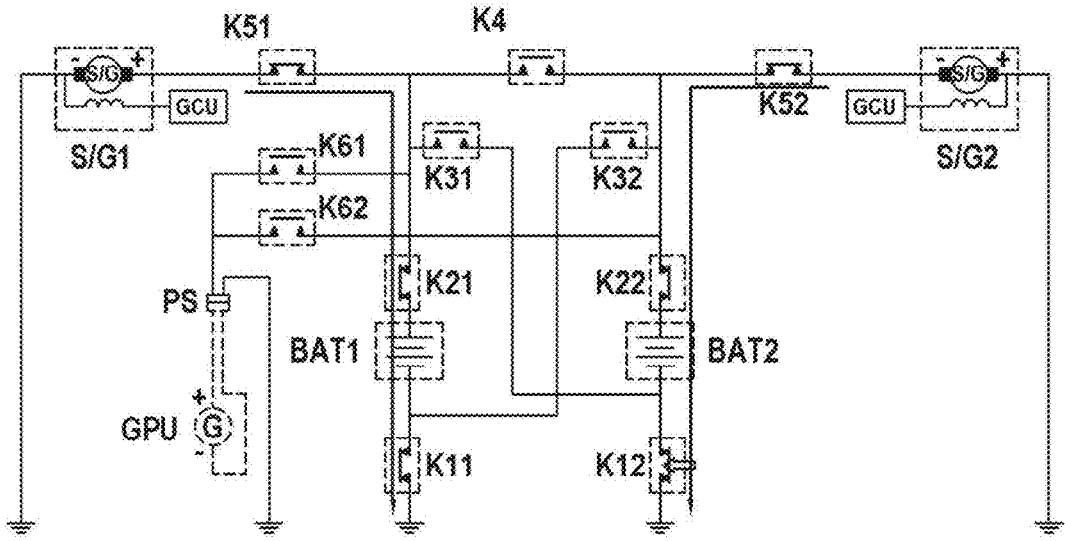
[Fig. 14]
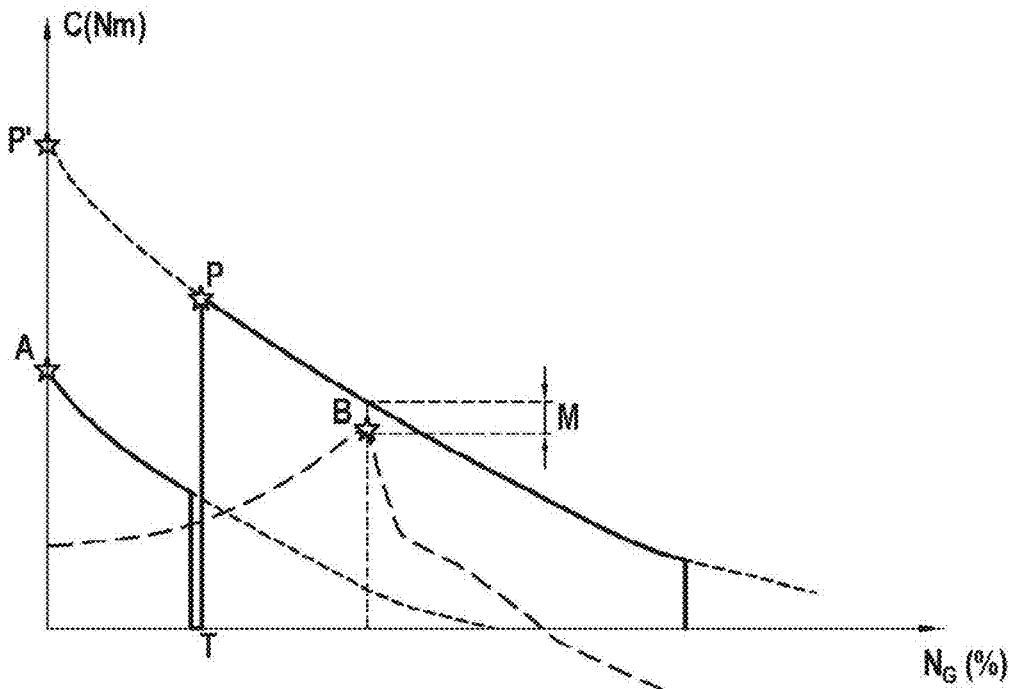

[Fig. 15]
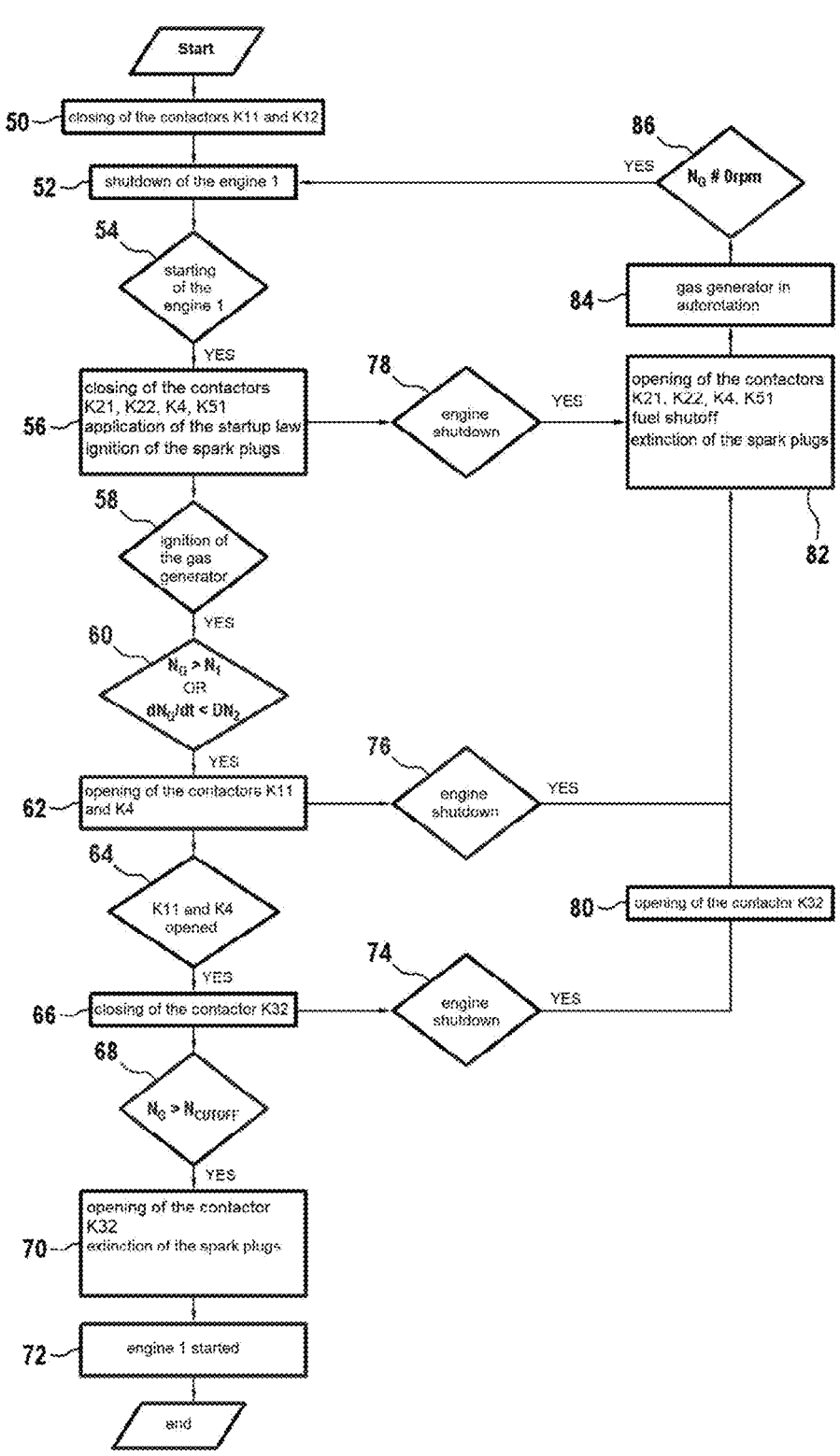

[Fig. 16]
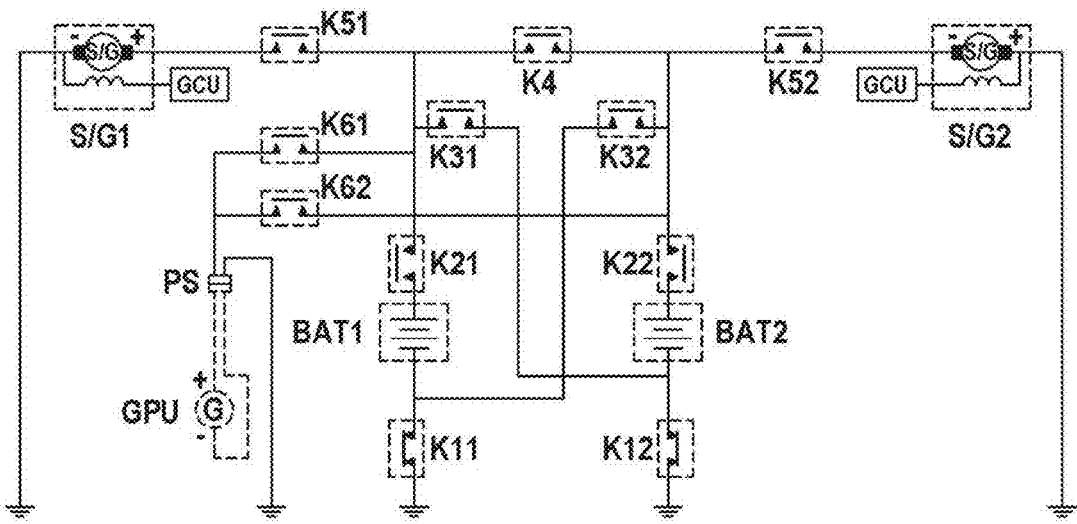
[Fig. 17]
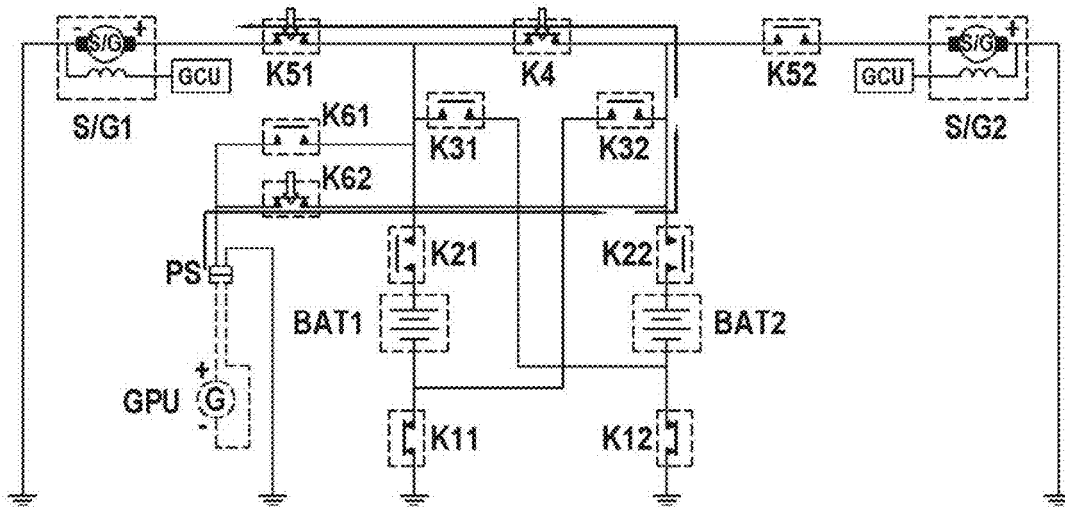

[Fig. 18]
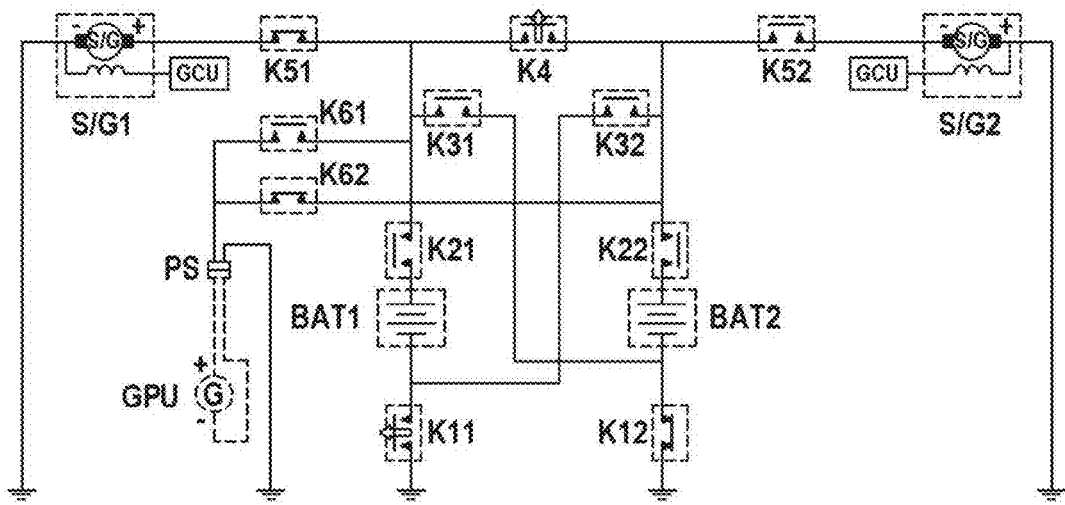
[Fig. 19]
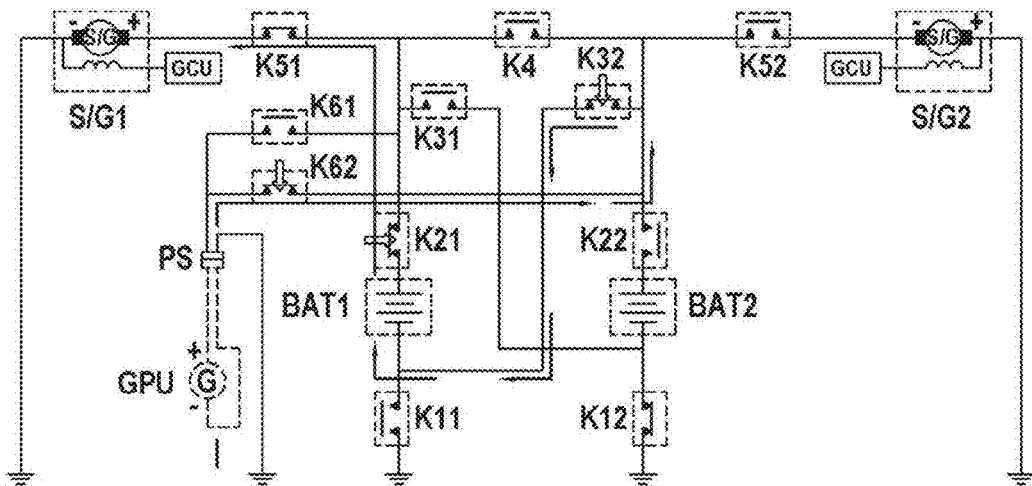

[Fig. 20]
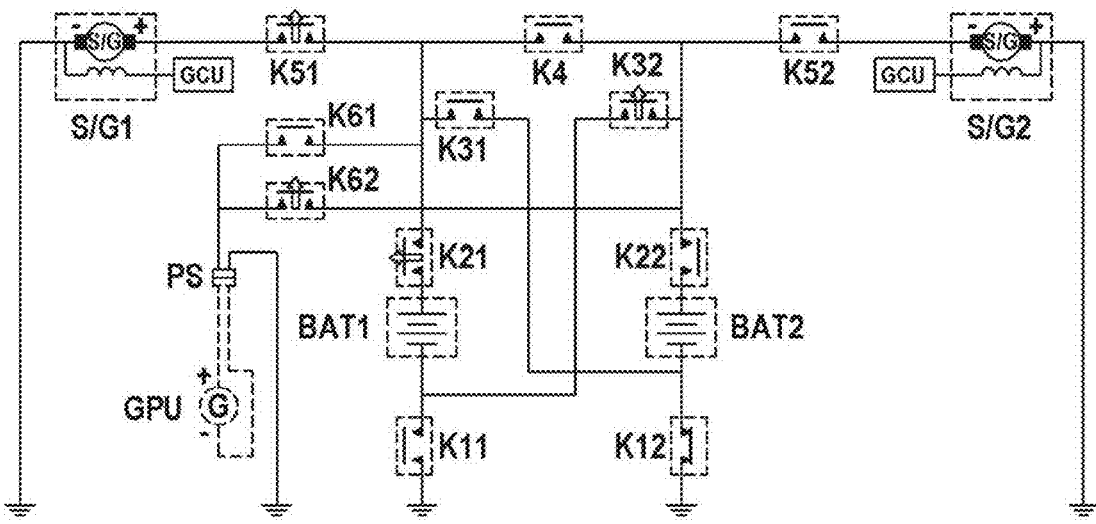
[Fig. 21]
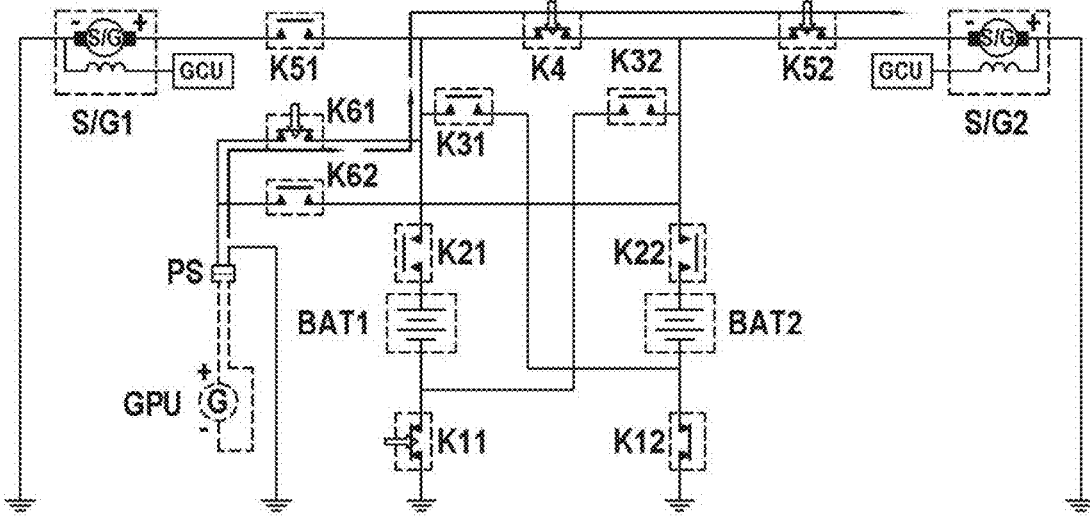

[Fig. 22]
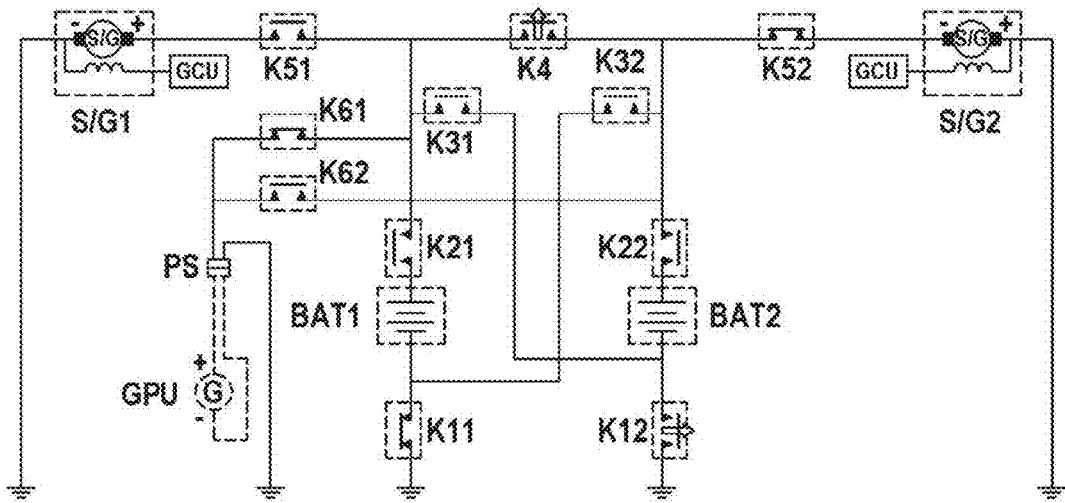
[Fig. 23]
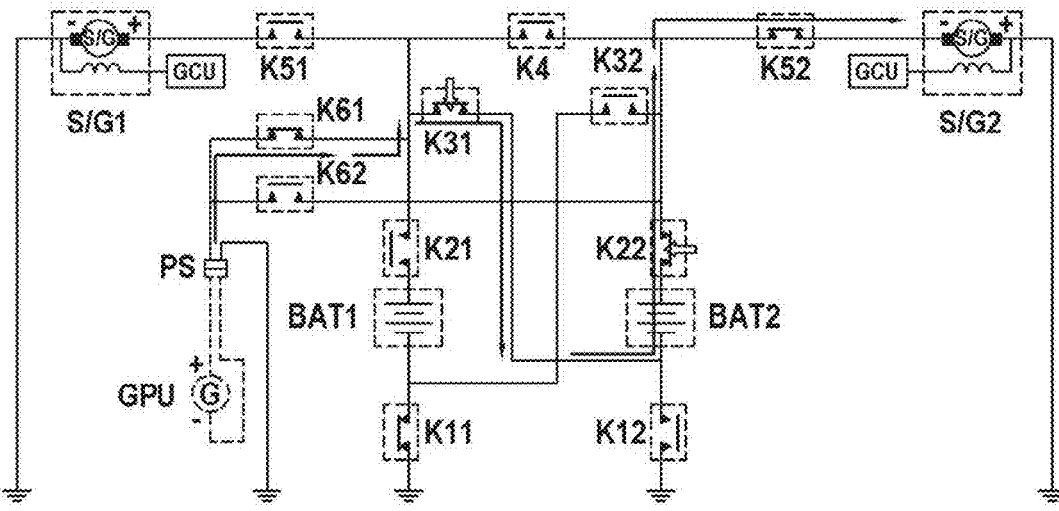

[Fig. 24]
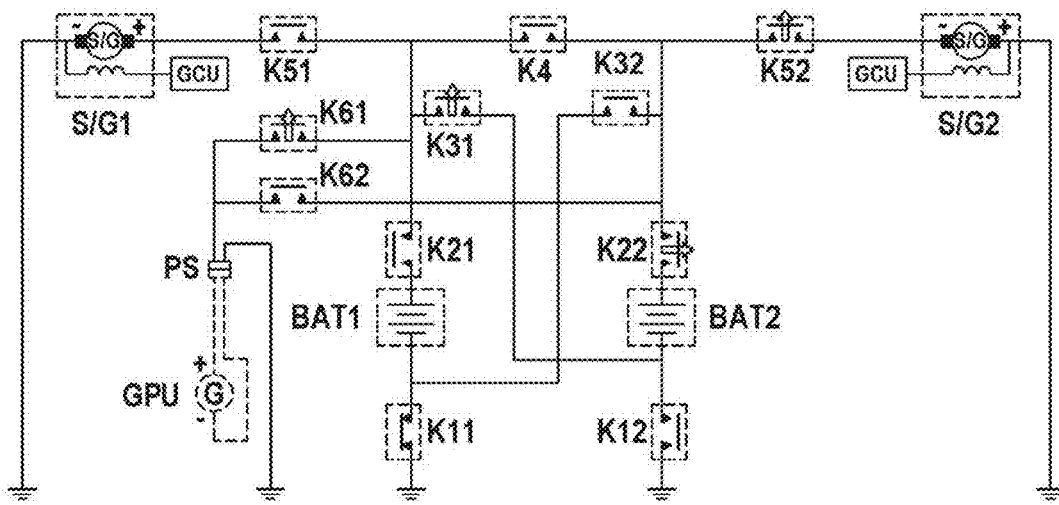
[Fig. 25]
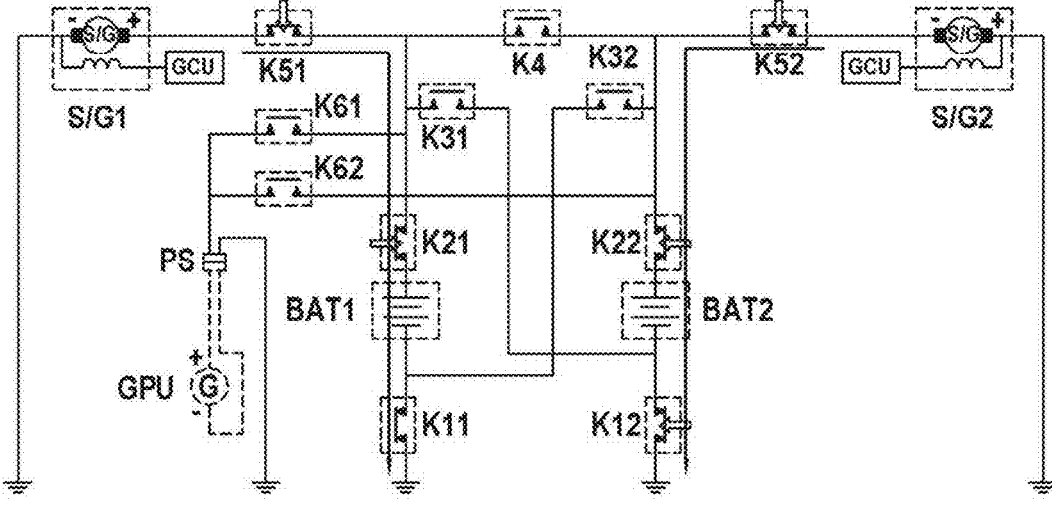

[Fig. 26]
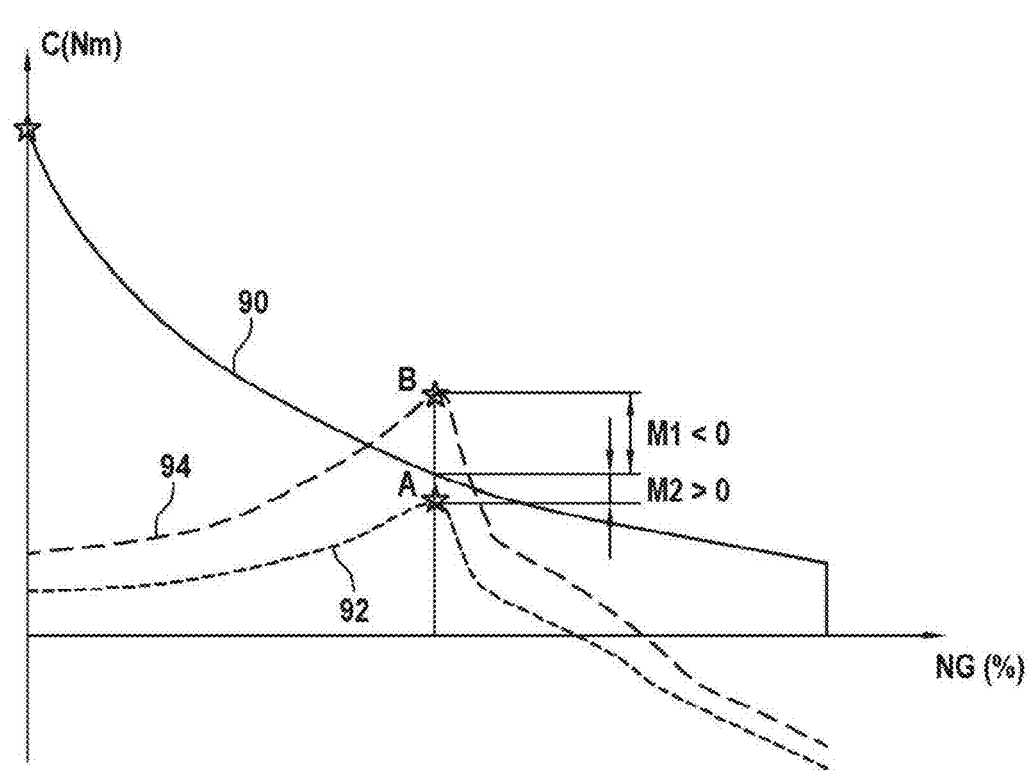

METHOD AND SYSTEM FOR DUAL-VOLTAGE START OF AN AERONAUTICAL TURBINE ENGINE HAVING A FREE TURBINE AND A SINGLE-SPOOL GAS GENERATOR

CROSS-REFERENCE TO RELATED APPLICATIONS

This is a National Stage Application under 35 U.S.C. § 371 of International Application No. PCT/FR2024/050194, filed Feb. 13, 2024, now published as WO 2024/170853 A1, which claims priority to French Patent Application No. 2301370, filed on Feb. 14, 2023, the entireties of which are incorporated herein by reference.

TECHNICAL FIELD

The present invention relates to the field of the control of the startup of the twin-engine aircraft turbomachines and more particularly concerns a method and system for the dual-voltage startup of an aeronautical free turbine and single-spool gas generator turbomachine.

PRIOR ART

Climate change is a major concern for many legislative and regulatory bodies around the world. Indeed, various carbon emission constraints have been, are being, or will be adopted by various states. Particularly, an ambitious standard applies at the same time to the new types of aircrafts and to those currently in operation, requiring the implementation of the technological solutions in order to make them compliant with current regulations. Civil aviation has been mobilizing for several years now to contribute to the fight against climate change.

Technological research efforts have already led to very significant improvements in the environmental performance of the aircrafts. The Applicant takes into account the impacting factors in all phases of design and development to obtain less energy-intensive and environmentally friendly aeronautical components and products whose integration and use in civil aviation have moderate environmental impacts, with the aim of improving the energy efficiency of these aircrafts.

Consequently, the Applicant is constantly working to reduce the climate impact through the use of virtuous development and manufacturing methods and processes that minimize the greenhouse gas emissions to the minimum possible in order to reduce the environmental footprint of the activity.

These ongoing research and development works focus on the new generations of aircraft turbomachines, the aircraft weight reduction, in particular through the materials used and the lighter onboard equipment, the development of the use of the electric technologies ensuring the propulsion and, as an essential complement to the technological progress, the aviation biofuels.

It is known that medium-powered turbomachines (typically comprised between 1,500 and 4,500 kW on the engine shaft) are complex to start because their gas generator has a large drag torque, due in particular to significant mechanical friction and to high compressor pressure ratio, air flow rate and power take-off due to the accessories driven by the gas generator (oil and fuel pumps in particular). The startup of these turbomachines therefore generally requires either a pneumatic starter or a high-powered high-voltage electric starter (for example powered with 115V AC/400 Hz). In both cases, the use of an auxiliary power generator (APU for Auxiliary Power Unit) as a source of pneumatic or electric power, on board the aircraft and previously started, is inevitable, which considerably complicates the architecture of the aircraft systems, therefore the overall mass and costs (in particular the costs of acquiring and overhauling the APU).

To avoid the use of an APU to start such a medium-powered turbomachine, it is known to resort to a generator called two-spool gas generator, consisting of two distinct coaxial compressor-turbine shafts and of the bearing housings supporting these shafts, usually referred to as HP (High-Pressure) spool and LP (Low-Pressure) spool respectively. The starting torque required to start such a turbomachine is then equivalent to that of a low-powered single-spool turbomachine, since the starter only has to drive the HP spool of the gas generator.

Thus, and as shown in FIG. 26, provided that it is powered by a battery of sufficient capacity, a 28V brushed starter-generator with a power of 12 kW/400 A nominal in generation is capable of providing a starting torque 90 sufficient to compensate for the moderate drag torque 92 of the HP spool characteristic of a two-spool architecture, in particular at the critical speed (point A) where this drag torque is maximum (positive acceleration margin M2). On the other hand, during the startup of an equivalent single-spool turbomachine, the larger drag torque 94 specific to this architecture exceeds the starting torque that such a 12 kW/400 A starter-generator can provide, in particular under detrimental ambient conditions (such as very low air, fuel and oil temperatures that maximize the resisting torques of the compressor and pumps), resulting in a negative acceleration margin M1 at the point of maximum drag torque (point B) and therefore the impossibility of starting the turbomachine in its entire desired startup range.

Furthermore, all things being equal, a two-spool turbomachine is significantly more complex from a mechanical point of view, more bulky, heavier, and more expensive than a single-spool turbomachine of equivalent performance, in particular due to the two coaxial shafts that constitute its gas generator.

Therefore there is also proposed a simpler starting system than the existing ones, that is to say not requiring the addition of an APU or a two-spool architecture, and based on the use of two 28V nominal voltage batteries connected first in parallel sharing the starting current then in series to deliver a double voltage of 56V. Powering a brushed starter-generator with two 28V batteries in series allows providing a significantly higher armature current and therefore mechanical torque capable of assisting the acceleration of the gas generator in the speed range where the drag torque of a single-spool gas generator is too high for the starting torque obtained with a single 28V battery.

However, such a system is not able to manage the problem of the too rapid acceleration it provides during the gas generator ignition window, which is likely to degrade the combustion chamber ignition performance. On the other hand, powering a brushed starter at a double voltage of 56V (instead of 28V on a single battery) at initially zero speed causes, during the first moments of the startup, a very high torque which requires mechanically oversizing the auxiliary transmission.

DISCLOSURE OF THE INVENTION

To this end, the invention is the result of technological research aimed at very significantly improving the aircraft performance and, in this sense, contributes to reducing the environmental impact of these aircrafts. To this end, the main purpose of the present invention is therefore a method and system for starting the medium-powered twin-engine aircraft turbomachines that overcome the aforementioned drawbacks.

This aim is achieved by a method for starting an aeronautical free turbine and single-spool gas generator turbomachine of a twin-engine aircraft including two independent electrical networks each comprising a 28V battery selectively powering a starter-generator, a turbomachine regulation computer controlling the startup of the turbomachine first at a nominal voltage of 28V by putting the two batteries in parallel and then at a nominal voltage of 56V by putting them in series while avoiding too rapid acceleration of the gas generator, characterized in that the turbomachine regulation computer is configured to order the serialization of the two batteries only once the gas generator combustion chamber is ignited and the speed of the gas generator is greater than a predetermined speed threshold N1 for ensuring, through this serialization, a positive acceleration margin at the point of maximum drag of the gas generator.

Thus, too rapid acceleration during the ignition window can be avoided for ensuring optimal conditions for the ignition of the combustion chamber of the turbomachine.

Advantageously, the serialization of the two batteries can also be ordered if, once the combustion chamber is ignited and before the maximum drag point, the acceleration of the gas generator is smaller than a predetermined acceleration threshold DN2, so as to avoid a risk of stagnation of the startup.

Preferably, the speed threshold N1 of the gas generator is comprised between 10 and 25% of a nominal speed NTOP of the gas generator or the acceleration threshold DN2 of the gas generator is comprised between 1 and 3% of a nominal speed NTOP/s of the gas generator.

Advantageously, the end-of-startup threshold $N_{CUTOFF}$ corresponding to the speed from which the gas generator of the turbomachine is capable of accelerating on its own to idle speed, is comprised between 50 and 60% of a nominal speed NTOP of the gas generator.

Preferably, in order to avoid a possible overlap of the electrical contactors resulting in short-circuiting a battery during reconfiguration, the serialization of the two batteries is preceded by a dead time lasting between 150 and 300 ms.

The invention also concerns a system for starting an aeronautical free turbine and single-spool gas generator turbomachine of a twin-engine aircraft including two independent electrical networks each comprising a 28V battery selectively powering a starter-generator, a turbomachine regulation computer controlling the startup of the turbomachine first at a nominal voltage of 28V by putting the two batteries in parallel and then at a nominal voltage of 56V by putting them in series while avoiding too rapid acceleration of the gas generator, characterized in that the turbomachine regulation computer is configured to order the serialization of the two batteries only once the combustion chamber of the gas generator is ignited and the speed of the gas generator is greater than a predetermined speed threshold N1 for ensuring, through this serialization, a positive acceleration margin at the point of maximum drag of the gas generator.

The starting system further includes a ground connection intended to be connected to a 28V ground power unit in which the turbomachine regulation computer is further configured to power a first starter-generator from the ground power unit and then by putting in series the ground power unit with one of the two batteries, once the combustion chamber is ignited and the speed of the gas generator is greater than a predetermined speed threshold N1 for ensuring, through this serialization, a positive acceleration margin at the point of maximum drag of the gas generator.

The invention finally concerns a rotary-wing or fixed-wing aircraft turbomachine comprising a starting system as mentioned above and the twin-engine aircraft incorporating it.

BRIEF DESCRIPTION OF THE DRAWINGS

Other characteristics and advantages of the present invention will emerge from the description given below, with reference to the appended drawings which illustrate one exemplary embodiment thereof without any limitation and in which:

FIG. 1 schematically illustrates a starting system in accordance with the invention applied to an aeronautical single-spool turbomachine, FIG. 2 shows one example of the electrical architecture of the starting system of FIG. 1, FIGS. 3 to 13 show the different steps of the operation of the electrical architecture of FIG. 2, FIG. 14 shows the variation curves of the starting torque and of the drag torque as a function of the speed of the gas generator, FIG. 15 presents a piloting flowchart for the system for starting a single-spool turbomachine in accordance with the invention, FIGS. 16 to 25 show the different steps of the operation of the electrical architecture of FIG. 2 from a ground connection, and FIG. 26 shows the variation curves of the starting and drag torques as a function of the gas generator speed for a single-spool turbomachine and a two-spool turbomachine.

DESCRIPTION OF THE EMBODIMENTS

In the multi-engine (and in particular twin-engine) architectures of the rotary-wing or fixed-wing aircrafts, the 28V DC electrical network is most often already organized into at least two independent networks, one per generator and therefore one per engine, each including at least one 28V battery.

The invention is therefore based on the principle of reconfiguring two pre-existing 28V batteries during startup so as to power the starter-generator (S/G) at a voltage of 28V (batteries in parallel) at the beginning of the startup, then at 56V (batteries in series) in order to overcome the resisting torque at the point of maximum drag of the gas generator.

However, in order to minimize the starting torque at zero speed as well as the acceleration of the gas generator in the ignition window, as a too rapid acceleration in this speed range can be detrimental to the ignition of the combustion chamber, it is advisable to power the starter-generator at 56V only from a certain speed threshold, preferably when the combustion chamber is already ignited.

The invention therefore proposes a low-voltage electrical network architecture suitable for a rotary-wing or fixed-wing twin-engine aircraft, including reconfiguration equipment (contactors), available voltage sources (batteries, ground connection, starter-generators) and associated with a strategy of management of this reconfiguration equipment for powering the starter-generators of the free turbine and single-spool gas generator turbomachines first at a nominal voltage of 28V, then at a nominal voltage of 56V by putting in series two 28V batteries, avoiding too rapid rapid acceleration in the ignition window.

It should be noted for the remainder of the description that the voltages of 28V and 56V are nominal operating values, the no-load voltage of a 28V battery typically being likely to vary between 18V and 26V depending on its state of charge and temperature, and the voltage actually applied to the terminals of the starter-generator being even lower due to the voltage drops in the cables and the contactors.

It should be noted that powering, for the limited duration of a startup of a turbomachine—typically around twenty seconds—at 56V, a brushed starter-generator designed for a nominal voltage of 28V, does not damage the latter, such a voltage of 56V remaining very significantly below the dielectric performance of the insulators, whether those of the windings of the rotating machine or the cables (see for example the aeronautical standards EN2282 and MIL-STD-704 which provide for transient overvoltages of the order of 50 to 60 Volts on the 28V on-board networks).

FIG. 1 illustrates one example of a single-spool architecture of an aeronautical medium-powered free turbine turbomachine equipped with its starting system and intended to be mounted in a twin-engine aircraft. The turbomachine 10 conventionally includes a compressor 12, a combustion chamber 14, a high-pressure turbine 16 (the assembly forming the gas generator), and a free turbine 18 driving the main transmission shaft 20 of the turbomachine actuating the main thruster 22 (helicopter rotor or propeller for example) via a main mechanical reduction gear 24. An accessory gearbox 26, mechanically linked to the gas generator, drives in particular the oil pumps and the pumps associated with the fuel injectors of the combustion chamber, and also generally includes a reduction assembly connecting it to the starting system 28.

FIG. 2 shows a diagram of the electrical architecture of the 28V electrical network of a twin-engine aircraft (fixed-wing or rotary-wing) provided with two free-turbine turbomachines and single-spool gas generator such as the one illustrated previously and adapted to the implementation of the invention. Typically, there are two electrical DC networks BUS 1 and BUS 2 each comprising a 28V brushed starter-generator S/G 1 and S/G 2 and a 28V battery BAT 1 and BAT 2, a ground connection PS allowing the on-board network to be connected to a 28V ground power unit GPU as well as various (electromechanical or static) contactors allowing the on-board network to be reconfigured and whose operation will be described further below:

Starting contactors K51/K52 for connecting the starter-generator 1 or 2 to the corresponding DC network BUS 1 or BUS 2, Ground contactors K61/K62 for connecting the ground connection PS respectively to the DC networks BUS 1 and BUS 2, A coupling contactor K4, often called "bus tie contactor", typically for connecting the DC network BUS 1 to the DC network BUS 2, in particular in the event of a starter-generator or turbomachine failure in flight, Bus contactors K21/K22 for connecting the battery 1 or the battery 2 respectively to the DC networks BUS 1 and BUS 2, Authorization contactors K11/K12, specific to the invention, for disconnecting the negative polarity of each of the two batteries from the reference potential (0V) of the aircraft in order to authorize the serialization, and Connection contactors K31/K32, also specific to the invention, for connecting the batteries in series.

The operating sequence for successively starting the two turbomachines from the two onboard batteries is now detailed in FIGS. 3 to 13. In the remainder of the description, by "starter" it will be meant "starter-generator."

FIG. 3 illustrates the initial state of this electrical architecture, corresponding to the shutdown of both turbomachines and in which the two contactors K11 and K12 are closed, so that the negative polarity of each of the two batteries is referenced to the reference potential of the aircraft. All other contactors are open.

FIG. 4 illustrates the next step corresponding to the first part of the startup of turbomachine No. 1. When the startup of the turbomachine No. 1 is requested, the contactors K21, K22, K4 and K51 are closed so as to power the starter No. 1 at a nominal voltage of 28V provided by the two batteries in parallel. Simultaneously, the turbomachine No. 1 refulation computer pilots the fuel injection in the combustion chamber according to an appropriate startup law and energizes the spark plugs, causing the ignition of the combustion chamber.

FIG. 5 illustrates the next step corresponding to the reconfiguration of the onboard network. From the moment the speed NG of the gas generator exceeds a certain speed threshold N1 or when its acceleration dNG/dt decreases below a certain threshold DN2, whose development is detailed below, the contactors K11 and K4 are opened. The starter No. 1 is therefore momentarily no longer powered.

FIG. 6 illustrates the next step corresponding to the second part of the startup of the turbomachine No. 1. As soon as the opening of the contactors K11 and K4 is confirmed (the confirmation can be obtained for example via the acquisition by the regulation system of an auxiliary contact of feedback of the position of the main contacts K11 and K4), the contactor K32 is closed, causing the powering of the starter by the two 28V batteries BAT 1 and BAT 2 connected in series, one of the two batteries, in this case BAT 2, being referenced to the reference potential of the aircraft. The startup of the turbomachine No. 1 therefore continues with its starter No. 1 powered at a nominal voltage of 56V.

FIG. 7 illustrates the next step corresponding to the end of startup and the autonomous acceleration of the gas generator of the turbomachine No. 1 to idle. When the starter cutoff speed threshold $N_{CUTOFF}$ is reached, the contactor K32 is opened. The gas generator continues its acceleration under its own power under the effect of the expansion of the gases in the combustion chamber.

FIG. 8 illustrates the next step corresponding to the switching of the starter No. 1 to generation mode. When the turbomachine No. 1 has completed its startup and reached the ground idle speed at which it is possible to take-off power from its gas generator, the contactor K11 is closed and the starter No. 1 can recharge the battery BAT 1.

With the turbomachine No. 1 started, the same must now be done with the turbomachine No. 2.

FIG. 9 therefore illustrates the next step corresponding to the first part of the startup of the turbomachine No. 2. When the startup of the turbomachine No. 2 is requested, the contactors K4 and K52 are closed so as to power the starter No. 2 at a nominal voltage of 28V provided by the two batteries in parallel as well as by the starter No. 1 then operating in parallel as a generator (generally, a function called "cross-start" function integrated into the GCU allows limiting the current provided by the starter No. 1 at its nominal current in generation, i.e., around 400 A in the case of a 12 kW generator/starter). Simultaneously, the turbomachine No. 2 regulation computer pilots the injection of fuel into the combustion chamber according to an appropriate startup law and energizes the spark plugs, causing the ignition of the combustion chamber.

FIG. 10 illustrates the next step of reconfiguring the on-board network. From the moment the speed NG of the gas generator exceeds a certain speed threshold N1 or when its acceleration dNG/dt decreases below a certain threshold, whose development is detailed below, the contactors K4 and K12 are opened. The starter No. 2 is therefore momentarily no longer powered.

FIG. 11 illustrates the next step corresponding to the second part of the startup of the turbomachine No. 2. As soon as the opening of the contactors K12 and K4 is confirmed, the contactor K31 is closed, allowing the starter to be powered by the two 28V batteries BAT 1 and BAT 2 connected in series, the battery BAT 1 and the starter No. 1 being still connected in parallel and referenced to the reference potential of the aircraft. The startup of the turbomachine No. 2 therefore continues with the starter No. 2 powered at a nominal voltage of 56V.

FIG. 12 illustrates the next step corresponding to the end of startup and the autonomous acceleration of the gas generator of the turbomachine No. 2 to idle. When the starter cutoff speed threshold $N_{CUTOFF}$ is reached, the contactor K31 is opened and the gas generator of the turbomachine No. 2 continues its acceleration under its own power. The two DC electrical networks BUS 1 and BUS 2 are from this moment isolated from each other.

FIG. 13 illustrates the final step of switching the starter No. 2 to generation mode. When the turbomachine No. 2 has completed its startup and reached the ground idle speed at which it is possible to take-off power from its gas generator, the contactor K12 is closed, and the starter No. 2 acting as a generator can recharge the battery BAT 2.

The onboard network is now configured in its nominal operating state. Both turbomachines are started, each starter operating as a generator supplies its own 28V network and can in particular recharge the corresponding battery, with the two DC networks BUS 1 and BUS 2 being isolated from each other by the contactors K4, K31 and K32 in the open position.

The shape of the starting torque curve as a function of the speed of the NG gas generator obtained by this device is illustrated in FIG. 14. It can be noted that during the dead time T corresponding to the reconfiguration of the batteries BAT 1 and BAT 2 (change from parallel connection to series connection in FIGS. 5 and 10), the starter torque briefly falls to zero since for a short period of time, the starter is no longer powered. Indeed, this dead time T is essential to confirm the opening of the contactors K4 and K11 (case of startup of the turbomachine No. 1) or K4 and K12 (case of startup of the turbomachine No. 2) before the reconfiguration of the batteries in series (closing of the contactor K32 or K31), in order to avoid a possible overlap leading to short-circuiting a battery, an event which must be absolutely avoided. Physically, with electromechanical contactors adapted to high starting currents, the duration of this dead time (confirmation of the opening+closing time limit) is typically of the order of 150 to 300 ms. Given the high mechanical inertia of the single-spool gas generator of a medium-powered turbomachine, the corresponding speed drop remains less than 1% of the nominal rotation speed NTOP of the gas generator, typically corresponding to the maximum power of the turbomachine at take-off (Take-Off Power), which guarantees the absence of risk of extinction of the chamber and does not perceptibly penalize the starting performance of the turbomachine.

It can be noted on the starting curve that the initial starting torque at zero speed (point A), during the closing of the contactors, is limited by the supply voltage corresponding to the parallelization of the batteries BAT 1 and BAT 2, i.e. a reduced voltage (at most equal to 28V) and that the combustion chamber is ignited when the starter is powered at a reduced voltage (batteries in parallel), while the gas generator acceleration remains moderate, therefore under favorable conditions.

It can also be noted that after the series reconfiguration of the two batteries, the starter torque becomes sufficient to guarantee a positive acceleration margin M at the maximum drag point (point B). simultaneously, the fact that the turbomachine is already rotating and therefore that the starter provides a non-zero counter electromotive force (EMF) allows limiting the amplitude of the armature current and therefore the starter torque during the reconfiguration of the two batteries in series (point P) to a level significantly lower than the one that would be obtained if the starter was energized with the two batteries in series from the beginning of the startup, at zero speed and therefore at zero EMF (point P'), thus avoiding mechanical oversizing of the accessory gearbox and of the auxiliary transmission.

FIG. 15 shows a flowchart for piloting the turbomachine No. 1 startup sequence from the perspective of the control of the various contactors.

In an initial step 50, the contactors K11 and K12 are initially closed in order to reference the negative polarity of each battery to the reference potential of the aircraft. The turbomachine No. 1 is therefore stopped (step 52).

Once the pilot gives the order to start the turbomachine No. 1 in a step 54, the turbomachine regulation computer (EECU) in a subsequent step 56 simultaneously orders the closing of the contactors K21, K22, K4 and K51, so as to power the starter No. 1 with the two 28V batteries BAT 1 and BAT 2 in parallel, the injection of fuel according to an appropriate startup law and the energization of the spark plugs.

As the gas generator increases in speed, air is admitted into the combustion chamber, the sparks from the spark plugs ignite the mixture and the combustion chamber ignites, leading, in a subsequent step 58, to the detection of the chamber ignition by the EECU (which is done for example by noting the increase of the TIT temperature for "Turbine Inlet Temperature" or the temperature T45 of the combustion gases).

The following step 60 consists in detecting at least one of the following two conditions necessary for the serialization of the batteries BAT 1 and BAT 2:

1) NG greater than a fixed threshold N1, speed threshold from which it is considered that the ignition of the combustion chamber is sufficiently stabilized so that the gas generator acceleration following the serialization of the two batteries no longer risks blowing out the flame and extinguishing the combustion chamber, which would result in interrupting the startup. This threshold N1 can be set to a value corresponding to the upper limit of the ignition window, for example between 10 and 25% of NTOP (essentially depending on the combustion chamber technology), 2) Or dNG/dt smaller than a fixed threshold DN2, indicating that the acceleration margin between the starter torque powered at 28V and the gas generator drag torque is becoming too low, with the risk of stagnation at startup (inability for the gas generator to accelerate even though the chamber is lit) and damage to the turbomachine due to over-temperature. This minimum acceleration criterion of the gas generator can be set to a value of the order of 1 to 3% of NTOP/s.

The serialization of the two batteries thus achieved then ensures a positive acceleration margin when the speed of the NG gas generator approaches the maximum resisting torque area, while protecting the turbomachine against the risks of stagnation at startup and extinction of the combustion chamber.

When the at least one of these two conditions is met, the opening of the contactors K11 and K4 is then ordered in a new step 62, and after a step 64 of confirming the effective opening of the contactors K11 and K4 (carried out for example in the case of electromechanical contactors, via the rereading of contacts of feedback of the position of the main contacts), the closing of the contactor K32 is ordered in a step 66. When, in a step 68, the speed of the gas generator reaches the end-of-startup threshold $N_{CUTOFF}$ corresponding to the speed from which the gas generator of the turbomachine is capable of accelerating on its own to the idle speed, generally of the order of 50 to 60% of NTOP, the EECU, in a step 70, orders the extinction of the spark plugs and the opening of the contactor K32 so as to cut off the starter No. 1.

The gas generator then continues to accelerate on its own in the next step 72. Once the idle speed is reached, the starter of the turbomachine No. 1 can be switched to electrical generation mode so as to power the 28V DC on-board network BUS 1 and recharge the battery BAT 1.

The flowchart of the turbomachine No. 2 startup sequence is of course similar. The startup operates in a similar manner, following the same steps and, in particular, by using the same conditions based on the speed or acceleration measurement of the gas generator to trigger the transition from the parallel connection to the series connection of the batteries BAT 1 and BAT 2 to power the starter No. 2.

It will be noted that at any time (steps 74, 76 or 78), the pilot can issue an order to shutdown the turbomachine, initiating two new steps in which the contactor K32 is open (step 80) and where the EECU cuts off the fuel injection, turns off the spark plugs, opens the contactors and thus deactivates the two starters (step 82), the gas generator finding itself in an autorotation rpm in the following step 84 before the turbomachine returns to its initial shutdown position of step 52 when the speed NG becomes zero (step 86).

Moreover, the diagram in FIG. 2 is also compatible with ground startup on a ground power unit (GPU), the main advantage being to conserve the charge of the onboard batteries. The startup sequence is illustrated in FIGS. 16 to 25.

FIG. 16 illustrates the initial state of the electrical architecture, which is identical to the battery startup corresponding to the shutdown of both turbomachines, and in which the two contactors K11 and K12 are closed, so that the negative polarity of each of the two batteries is referenced to the reference potential of the aircraft. All the other contactors are open.

FIG. 17 illustrates the next step corresponding to the first part of the startup of the turbomachine No. 1. When the startup of the turbomachine No. 1 is requested, the contactors K62, K4 and K51 are closed so as to power the starter No. 1 at a nominal voltage of 28V provided by the GPU. Simultaneously, the turbomachine regulation computer (EECU) of the turbomachine No. 1 pilots the fuel injection into the combustion chamber according to an appropriate startup law and energizes the spark plugs, igniting the combustion chamber.

FIG. 18 illustrates the step of reconfiguring the onboard electrical network. From the speed threshold N1 or acceleration threshold DN2 defined above, the contactors K4 and K11 are open. The starter No. 1 is therefore temporarily no longer powered.

FIG. 19 illustrates the next step corresponding to the second part of the startup of the turbomachine No. 1. As soon as the opening of the contactors K4 and K11 is confirmed, the contactors K32 and K21 are closed, and the starter is then powered by the GPU and the 28V battery BAT 1 in series, the GPU being referenced to the reference potential of the aircraft. The startup of the turbomachine No. 1 therefore continues with its starter powered at a nominal voltage of 56V.

FIG. 20 illustrates the next step corresponding to the end of startup and the autonomous acceleration of the gas generator of the turbomachine No. 1 to idle. When the starter cutoff speed threshold $N_{CUTOFF}$ is reached, the contactors K21, K32, K51 and K62 are opened. The gas generator of the turbomachine No. 1 continues its acceleration under its own power.

FIG. 21 illustrates the step corresponding to the first part of the startup of the turbomachine No. 2. When the startup of the turbomachine No. 2 is requested, the contactors K61, K4 and K52 are closed so as to power the starter No. 2 at a nominal voltage of 28V provided by the GPU, while K11 is closed to reference the 28V battery BAT 1 again to the aircraft mass. Simultaneously, the EECU of the turbomachine No. 2 pilots the fuel injection into the combustion chamber according to an appropriate startup law and energizes the spark plugs, causing the ignition of the combustion chamber.

FIG. 22 corresponds to the reconfiguration of the onboard electrical network. From the speed threshold N1 or acceleration threshold DN2 defined above, the contactors K4 and K12 are open. The starter No. 2 is therefore momentarily no longer powered.

FIG. 23 illustrates the step corresponding to the second part of the startup of the turbomachine No. 2. As soon as the opening of the contactors K4 and K12 is confirmed, the contactors K31 and K22 are closed, and the starter No. 2 is then powered by the GPU and the 28V battery BAT 2 in series, the GPU being referenced to the reference potential of the aircraft. The startup of the turbomachine No. 2 therefore continues with the starter No. 2 powered at a nominal voltage of 56V.

FIG. 24 illustrates the next step corresponding to the end of startup and the autonomous acceleration of the gas generator of the turbomachine No. 2 to idle. When the starter cutoff speed threshold $N_{CUTOFF}$ is reached, the contactors K22, K31, K52 and K61 are opened, with the two DC electrical networks BUS 1 and BUS 2 being isolated from each other from this moment on. The gas generator then continues its acceleration under its own power.

FIG. 25 illustrates the final step performed once the turbomachine has reached its idle speed, consisting in switching the two starters to generator mode and recharging the two batteries by closing the contactors K51, K21, K12, K22 and K52.

The invention thus offers numerous advantages over a starting system requiring an APU or a turbomachine architecture with a two-spool gas generator:

It requires only standard off-the-shelf hardware (28V DC brushed starter-generators, series starter, high-current contactors), It is fully compatible with a 28V DC on-board electrical network on the condition of having two 28V starting batteries of sufficient capacity, It avoids oversizing the accessory gearbox, as the starter is powered by the two batteries in series only above a certain speed threshold, It allows starting a medium-powered turbomachine with a single-spool gas generator and high drag torque, by limiting the torque within the combustion chamber ignition window, and The associated software modifications for managing the startup sequence are simple and therefore technically low-risk in terms of development.

The invention claimed is:

1. A method for starting an aeronautical free turbine and single-spool gas generator turbomachine of a twin-engine aircraft including two independent electrical networks each comprising a 28V battery selectively powering a starter-generator, wherein to ensure, under the control of a turbomachine regulation computer, the startup of the gas generator turbomachine first at a nominal voltage of 28V by putting the two batteries in parallel and then at a nominal voltage of 56V by putting the two batteries in series while avoiding too rapid acceleration of the gas generator turbomachine, the serialization of the two batteries is ordered only once a combustion chamber of the gas generator turbomachine is ignited and the speed of the gas generator turbomachine is greater than a predetermined speed threshold N1 for ensuring, through this serialization, a positive acceleration margin at a point of maximum drag of the gas generator.

2. The starting method according to claim 1, wherein the speed threshold N1 of the gas generator turbomachine is comprised between 10 and 25% of a nominal speed NTOP of the gas generator turbomachine.

3. The starting method according to claim 1, wherein the serialization of the two batteries is further ordered if, once the combustion chamber has been ignited and before the maximum drag point, the acceleration of the gas generator is smaller than a predetermined acceleration threshold DN2, so as to avoid a risk of stagnation of the startup.

4. The starting method according to claim 3, wherein the acceleration threshold DN2 of the gas generator turboma-chine is comprised between 1 and 3% of a nominal speed NTOP/s of the gas generator turbomachine.

5. The starting method according to claim 1, wherein, in order to avoid a possible overlap of the electrical contactors resulting in short-circuiting one of the two batteries during reconfiguration, the serialization of the two batteries is preceded by a dead time lasting between 150 and 300 ms.

6. A system for starting an aeronautical free turbine and single-spool gas generator turbomachine of a twin-engine aircraft including two independent electrical networks each comprising a 28V battery selectively powering a starter-generator, a turbomachine regulation computer controlling the startup of the gas generator turbomachine first at a nominal voltage of 28V by putting the two batteries in parallel and then at a nominal voltage of 56V by putting the two batteries in series while avoiding too rapid acceleration of the gas generator turbomachine, wherein the turboma-chine regulation computer is configured to order the serialization of the two batteries only once a combustion chamber of the gas generator turbomachine is ignited and the speed of the gas generator turbomachine is greater than a prede-termined speed threshold N1 for ensuring, through this serialization, a positive acceleration margin at the point of maximum drag of the gas generator.

7. The starting system according to claim 6, further including a ground connection intended to be connected to a 28V ground power unit.

8. The starting system according to claim 7, wherein the turbomachine regulation computer is further configured to power a first starter-generator from the ground power unit and then by putting in series the ground power unit with one of the two batteries, once the combustion chamber is ignited and the speed of the gas generator turbomachine is greater than a predetermined speed threshold N1 for ensuring, through this serialization, a positive acceleration margin at the point of maximum drag of the gas generator turboma-chine.

9. A rotary-wing or fixed-wing twin-engine aircraft turb-omachine comprising a starting system according to claim 6.

10. The rotary-wing or fixed-wing twin-engine aircraft comprising two turbomachines according to claim 9.

*    *    *    *    *